United States Patent
Tanaka et al.

(10) Patent No.: US 8,511,482 B2
(45) Date of Patent: Aug. 20, 2013

(54) METHOD OF STABLY PRODUCING MICROPOROUS MEMBRANE AND USE THEREOF IN METHOD OF SEPARATING AND PURIFYING NUCLEIC ACID

(75) Inventors: Hideaki Tanaka, Asaka (JP); Yoshihiko Makino, Asaka (JP)

(73) Assignee: Kurashiki Boseki Kabushiki Kaisha, Kurashiki-Shi, Okayama (JP)

( * ) Notice: Subject to any disclaimer, the term of this patent is extended or adjusted under 35 U.S.C. 154(b) by 1101 days.

(21) Appl. No.: 11/630,135

(22) PCT Filed: Sep. 15, 2005

(86) PCT No.: PCT/JP2005/017431
§ 371 (c)(1),
(2), (4) Date: Dec. 20, 2006

(87) PCT Pub. No.: WO2006/030964
PCT Pub. Date: Mar. 23, 2006

(65) Prior Publication Data
US 2008/0061001 A1    Mar. 13, 2008

(30) Foreign Application Priority Data
Sep. 16, 2004    (JP) .............................. P.2004-269855

(51) Int. Cl.
*B01D 71/16* (2006.01)
*B01D 39/16* (2006.01)
*B01D 39/14* (2006.01)
*B01D 71/12* (2006.01)
*C02F 1/44* (2006.01)

(52) U.S. Cl.
USPC ... 210/500.3; 210/655; 210/651; 210/500.31; 210/500.32; 210/500.29; 427/244; 427/246

(58) Field of Classification Search
USPC ............... 210/500.29, 500.3, 500.31, 500.32, 210/655, 651; 427/243–246
See application file for complete search history.

(56) References Cited

U.S. PATENT DOCUMENTS 3,285,765 A * 11/1966 Cannon ..................... 106/170.49
3,429,957 A *  2/1969 Ulrich ............................ 264/49

(Continued)

FOREIGN PATENT DOCUMENTS

GB     816 572 A    7/1959
JP     43-15698     7/1943

(Continued)

OTHER PUBLICATIONS

English language abstract of JP 62087211 A, pp. 1-2.*
English language translation of JP 62087211A.*

*Primary Examiner* — David C Mellon
(74) *Attorney, Agent, or Firm* — Birch, Stewart, Kolasch & Birch, LLP (57) ABSTRACT

A method of producing a porous membrane, the method comprising: casting a polymer solution, in which a polymer is dissolved in a mixture of a good solvent, a poor solvent and a non-solvent, over a support, so as to form a casted polymer solution; drying the casted polymer solution, so as to form a cast film; and subjecting the cast film to a phase separation, wherein the porous membrane is produced under a condition where a temperature of a casted surface is lower than a temperature of the polymer solution, and each of a temperature change of the polymer solution and a temperature change of the casted surface is kept within ±3.0° C.

19 Claims, 3 Drawing Sheets

(56) References Cited

U.S. PATENT DOCUMENTS

| | | | |
|---|---|---|---|
| 3,460,683 A * | 8/1969 | Cannon | 210/500.3 |
| 3,556,305 A * | 1/1971 | Shorr | 210/490 |
| 3,648,845 A * | 3/1972 | Riley | 210/490 |
| 3,662,046 A * | 5/1972 | Woo et al. | 264/41 |
| 3,883,626 A * | 5/1975 | Kamide et al. | 264/49 |
| 3,940,336 A * | 2/1976 | Macevicz et al. | 134/22.18 |
| 4,062,782 A * | 12/1977 | Kunst et al. | 210/500.3 |
| 7,381,330 B2 * | 6/2008 | Petersen et al. | 210/500.3 |
| 2003/0170664 A1 | 9/2003 | Mori et al. | |
| 2003/0194668 A1 * | 10/2003 | Kawanishi et al. | 430/641 |
| 2007/0221563 A1 * | 9/2007 | Sakaino et al. | 210/257.2 |

FOREIGN PATENT DOCUMENTS

| | | | |
|---|---|---|---|
| JP | 45-4633 | | 2/1970 |
| JP | 54-131025 | A | 10/1979 |
| JP | 55-6406 | B2 | 2/1980 |
| JP | 60-806 | A | 1/1985 |
| JP | 62087211 | A * | 4/1987 |
| JP | 2-135131 | A | 5/1990 |
| JP | 10-216489 | A | 8/1998 |
| JP | 11-181133 | A | 7/1999 |
| JP | 2003-128691 | A | 5/2003 |
| JP | 2005-192558 | A | 7/2005 |
| WO | WO-02/24432 | A2 | 3/2002 |
| WO | WO 03/015902 | A2 * | 2/2003 |

* cited by examiner

METHOD OF STABLY PRODUCING MICROPOROUS MEMBRANE AND USE THEREOF IN METHOD OF SEPARATING AND PURIFYING NUCLEIC ACID

TECHNICAL FIELD

The present invention relates to a method of stably producing a microporous membrane. More particularly, the present invention relates to a method of stably producing a nucleic acid-adsorbable microporous membrane for use in a method of separating a nucleic acid from a sample solution containing a nucleic acid and purifying the nucleic acid and use of the microporous membrane in a method of separating and purifying nucleic acid.

BACKGROUND ART

Microporous cellulose acetate membranes have long been marketed and widely used as separating membrane or filter. Various methods of producing a microporous cellulose acetate membrane have been proposed (as in JP-B-43-15698 and JP-B-55-6406). Further, a production method has been proposed which comprises subjecting a microporous cellulose acetate membrane to saponification to produce a microporous cellulose membrane (as in JP-B-45-4633). Such a microporous cellulose membrane has been marketed and used as a solvent-resistant filter.

As well known, nucleic acid has been used in various forms in various arts. In the art of recombined nucleic acid technique for example, it is required that nucleic acid be used in the form of probe, genomic nucleic acid or plasmidic nucleic acid.

Nucleic acids are used in various methods also in the art of diagnosis. For example, the nucleic acid probe is daily used to detect and diagnose man for pathogen. Nucleic acids are used also to detect genetic troubles or food contaminants. Further, nucleic acids are daily used to confirm the position of predetermined nucleic acids or identify or isolate these nucleic acids for various purposes, including the preparation of genetic map and the genetic expression by cloning or genetic recombination.

In most cases, however, nucleic acids are available only in an extremely small amount. The isolation and purification of nucleic acids needs a complicated procedure and thus takes much time. This time-consuming complicated step can easily lead to the loss of nucleic acids to disadvantage. Further, the purification of nucleic acids in serum, urea or sample obtained from bacteria culture is accompanied also by the production of contaminants or the consequence of false positive.

As one of methods of simply and efficiently separating and purifying nucleic acids to solve the aforementioned problems, a method which comprises allowing a nucleic acid to be adsorbed to or desorbed from a porous membrane made of an organic polymer having a hydroxyl group on the surface thereof such as cellulose is disclosed in, e.g., JP-A-2003-128691.

DISCLOSURE OF THE INVENTION

However, the use of such a nucleic acid-adsorbable microporous membrane in the separation and purification of nucleic acid has caused some troubles. In some detail, the microporous membranes prepared according to the related art methods have a slight longitudinal locality of properties such as pore diameter. Accordingly, when a nucleic acid sample containing a relatively great amount of suspended matters is processed by the related art microporous membranes, there occurs some difference in the time required for purification of nucleic acid or clogging disabling purification depending on the longitudinal position on the microporous membrane at which the specimen is sampled. Further, though not leading to complete clogging, it takes remarkably much time to separate and purify nucleic acid. It has thus been desired to solve these problems by improving the method of producing a nucleic acid-adsorbable microporous membrane such that a nucleic acid-adsorbable microporous membrane having a stabler quality than ever free of longitudinal locality of membrane properties such as pore diameter can be provided.

It is therefore an aim of the invention to provide a nucleic acid-adsorbable microporous membrane having reduced longitudinal locality of membrane properties such as pore diameter and hence a stabler quality than ever and a method of producing same.

The inventors made extensive studies of various factors to solve the aforementioned problems. As a result, it was found that the use of a porous membrane produced by a method of producing a porous membrane which comprises steps of casting a solution of a polymer in a mixture of good solvent, poor solvent and non-solvent over a support, drying the cast film and then subjecting the cast film to phase separation, wherein the production of a porous membrane is effected with the temperature of the casted surface predetermined lower than that of the polymer solution and the temperature change of the polymer solution and the casted surface each kept within ±3.0° C., makes it possible to eliminate the longitudinal locality of membrane properties and solve the aforementioned problems such as clogging and dispersion of purifying time that have heretofore occurred during the purification of nucleic acid from a sample containing a relatively large amount of suspended matters. The invention has been worked out on the basis of this knowledge. In other words, the invention has the following constitutions.

(1) A method of producing a porous membrane, the method comprising:

casting a polymer solution, in which a polymer is dissolved in a mixture of a good solvent, a poor solvent and a non-solvent, over a support, so as to form a casted polymer solution;

drying the casted polymer solution, so as to form a cast film; and subjecting the cast film to a phase separation, wherein the porous membrane is produced under a condition where a temperature of a casted surface is lower than a temperature of the polymer solution, and each of a temperature change of the polymer solution and a temperature change of the casted surface is kept within ±3.0° C.

(2) The method as described in (1) above, wherein the polymer solution is an polymer solution of an ester derivative of cellulose.

(3) The method as described in (2) above, wherein the ester derivative of cellulose comprises at least one selected from the group consisting of a carboxylic acid ester, a nitric acid ester, a sulfuric acid ester, a sulfonic acid ester, a phosphoric acid ester, a phosphonic acid ester and a pyrophosphoric acid ester of cellulose.

(4) The method as described in (2) above, wherein the ester derivative of cellulose is an acetyl cellulose.

(5) The method as described in (4) above, wherein the acetyl cellulose is a mixture of a triacetyl cellulose and a diacetyl cellulose.

(6) The method as described in any of (1) to (5) above, wherein the good solvent is a methylene chloride, the poor solvent is a methanol and the non-solvent is a water.

(7) A method of producing a porous membrane, the method comprising:

subjecting a porous membrane produced by a method as described in any of (2) to (6) above to a saponification treatment.

(8) The method as described in any of (1) to (7) above, wherein a minimum pore diameter of the porous membrane is 0.1 µm or more.

(9) The method as described in any of (1) to (8) above, wherein the porous membrane has a front surface and a back surface asymmetrical with each other.

(10) The method as described in any of (1) to (9) above, wherein a ratio of a maximum pore diameter to a minimum pore diameter of the porous membrane is 2 or more.

(11) The method as described in any of (1) to (10) above, wherein a thickness of the porous membrane is from 10 µm to 500 µm.

(12) The method as described in any of (1) to (11) above, wherein a void ratio of the porous membrane is from 50% to 95%.

(13) The method as described in any of (1) to (12) above, wherein a bubble point of the porous membrane is from 0.1 to 10 kgf/cm$^2$.

(14) The method as described in any of (1) to (13) above, wherein a pressure loss of the porous membrane is from 0.1 kPa to 100 kPa.

(15) The method as described in any of (1) to (14) above, wherein a water permeability of the porous membrane at a temperature of 25° C. and a pressure of 1 kg/cm$^2$ is from 1 to 5,000 ml/cm$^2$ per minute.

(16) The method as described in any of (1) to (15) above, wherein an adsorption amount of nucleic acid per mg of the porous membrane is 0.1 µg or more.

(17) A use of a porous membrane produced by a method as described in any of (1) to (16) above in a method of separating and purifying nucleic acid, the method comprising:

(1) passing a sample solution containing a nucleic acid through the porous membrane to allow the nucleic acid to be adsorbed to an interior of the porous membrane;

(2) passing a washing solution through the porous membrane to wash the porous membrane while the nucleic acid is adsorbed to the porous membrane; and (3) passing a recovering solution through the porous membrane to allow the nucleic acid to be desorbed from the interior of the porous membrane.

BRIEF DESCRIPTION OF THE DRAWING

FIG. 4 is a sectional view of an example of the nucleic acid separating and purifying unit, wherein 1 denotes dope tank with temperature controller; 2 denotes feed pump; 3 denotes casting die 4 denotes PET base film; 5 denotes endless band; 6 denotes temperature controlling drum; 7 denotes drier; 8 denotes drier; A denotes PET base feed roll; B denotes PET base+microporous membrane winding roll; C denotes unwinding machine with slitter; D denotes peeling bar; E denotes PET base winding roll; F denotes microporous membrane winding roll; 10 denotes saponifying unit; 11 denotes microporous cellulose ester membrane; 12 denotes saponified film; 15 denotes saponifying unit; 16 denotes neutralizing unit; 17 denotes rinsing unit; 18 denotes drier; 25 denotes drum; 26 denotes belt; 500 denotes container for nucleic acid separating and purifying unit; 100 denotes main body; 200 denotes cover; and 300 denotes solid phase (surface-saponified microporous triacetyl cellulose membrane).

BEST MODE FOR CARRYING OUT THE INVENTION

The production of the microporous membrane of the invention can be carried out in the following manner.

Firstly, a solution of a polymer in a mixture of a good solvent, a poor solvent and a non-solvent (dope) is prepared. As the raw polymer to be used in the production method of the invention there may be used an esterification product of a polymer having a hydroxyl group. In particular, an ester derivative of a polymer having a polysaccharide structure, an ester derivative of a polyvinyl alcohol, etc. are preferred.

[Polymer]

Specific examples of organic materials having a polysaccharide structure employable herein include cellulose, hemicellulose, dextran, agarose, dextrin, amylose, amylopectin, starch, glycogen, pullulan, mannan, glucomannan, lichenan, isolichenan, laminaran, carrageenan, xylan, fructane, alginic acid, hyaluronic acid, chondroitin, chitin and chitosan. Further examples of organic materials having a polysaccharide structure employable herein include derivatives of some of these polysaccharide structures. In particular, ester derivatives of these polysaccharide structures are preferred. The invention is not limited to the above exemplified materials so far as polysaccharide structures and derivatives thereof are used.

The ester constituting the ester derivatives of polysaccharide structure is preferably selected from any one or more of carboxylic acid ester, nitric acid ester, sulfuric acid ester, sulfonic acid ester, phosphoric acid ester, phosphonic acid ester and pyrophosphoric acid ester.

The aforementioned carboxylic acid ester having a polysaccharide structure is preferably selected from any one or more of alkylcarbonyl ester, alkenylcarbonyl ester, aromatic carbonyl ester and aromatic alkylcarbonyl ester.

The ester group constituting the aforementioned alkylcarbonyl ester having a polysaccharide structure is preferably selected from any one or more of acetyl group, propionyl group, butyloyl group, valeryl group, heptanoyl group, octanoyl group, decanoyl group, dodecanoyl group, tridecanoyl group, hexadecanoyl group and octadecanoyl group.

The ester group constituting the aforementioned alkenylcarbonyl ester having a polysaccharide structure is preferably selected from any one or more of acryl group and methacryl group.

The ester group constituting the aforementioned aromatic carbonyl ester having a polysaccharide structure is preferably selected from any one or more of benzoyl group and naphthaloyl group.

Preferred examples of the nitric acid ester having a polysaccharide structure include nitrocellulose, nitrohemicellulose, nitrodextran, nitroagarose, nitrodextrin, nitroamylose, nitroamylopectin, nitroglycogen, nitropullulan, nitromannan, nitroglucomannan, nitrolichenan, nitroisolichenan, nitrolaminaran, nitrocarrageenan, nitroxylan, nitrofructane, nitroalginic acid, nitrohyaluronic acid, nitrochondroitin, nitrochitin, and nitrochitosan.

Preferred examples of the aforementioned sulfuric acid ester having a polysaccharide structure include cellulose sulfuric acid, hemicellulose sulfuric acid, dextran sulfuric acid, agarose sulfuric acid, dextrin sulfuric acid, amylose sulfuric acid, amylopectin sulfuric acid, glycogen sulfuric acid, pullulan sulfuric acid, mannan sulfuric acid, glucomannan sulfuric acid, lichenan sulfuric acid, isolichenan sulfuric acid, laminaran sulfuric acid, carrageenan sulfuric acid, xylan sulfuric acid, fructane sulfuric acid, alginic-sulfuric acid, hyaluronic-sulfuric acid, chondroitin sulfuric acid, chitin sulfuric acid, and chitosan sulfuric acid.

The aforementioned sulfonic acid ester having a polysaccharide structure is preferably selected from any one or more of alkylsulfonic acid ester, alkenylsulfonic acid ester, aromatic sulfonic acid ester and aromatic alkylsulfonyl acid ester.

Preferred examples of the phosphoric acid ester having a polysaccharide structure include cellulose phosphoric acid, hemicellulose phosphoric acid, dextran phosphoric acid, agarose phosphoric acid, dextrin phosphoric acid, amylose phosphoric acid, amylopectin phosphoric acid, glycogen phosphoric acid, pullulan phosphoric acid, mannan phosphoric acid, glucomannan phosphoric acid, lichenan phosphoric acid, isolichenan phosphoric acid, laminaran phosphoric acid, carrageenan phosphoric acid, xylan phosphoric acid, fructane phosphoric acid, alginic-phosphoric acid, hyaluronic-phosphoric acid, chondroitin phosphoric acid, chitin phosphoric acid, and chitosan phosphoric acid.

Preferred examples of the aforementioned phosphonic acid ester having a polysaccharide structure include cellulose phosphonic acid, hemicellulose phosphonic acid, dextran phosphonic acid, agarose phosphonic acid, dextrin phosphonic acid, amylose phosphonic acid, amylopectin phosphonic acid, glycogen phosphonic acid, pullulan phosphonic acid, mannan phosphonic acid, glucomannan phosphonic acid, lichenan phosphonic acid, isolichenan phosphonic acid, laminaran phosphonic acid, carrageenan phosphonic acid, xylan phosphonic acid, fructane phosphonic acid, alginic-phosphonic acid, hyaluronic-phosphonic acid, chondroitin phosphonic acid, chitin phosphonic acid, and chitosan phosphonic acid.

Preferred examples of the aforementioned pyrophosphoric acid ester having a polysaccharide structure include cellulose pyrophosphoric acid, hemicellulose pyrophosphoric acid, dextran pyrophosphoric acid, agarose pyrophosphoric acid, dextrin pyrophosphoric acid, amylose pyrophosphoric acid, amylopectin pyrophosphoric acid, glycogen pyrophosphoric acid, pullulan pyrophosphoric acid, mannan pyrophosphoric acid, glucomannan pyrophosphoric acid, lichenan pyrophosphoric acid, isolichenan pyrophosphoric acid, laminaran pyrophosphoric acid, carrageenan pyrophosphoric acid, xylan pyrophosphoric acid, fructane pyrophosphoric acid, alginic-pyrophosphoric acid, hyaluronic-pyrophosphoric acid, chondroitin pyrophosphoric acid, chitin pyrophosphoric acid, and chitosan pyrophosphoric acid.

Those obtained by etherifying the hydroxyl group in any of the aforementioned polysaccharide structures to an arbitrary substitution degree are preferably used as well. In the case where as polysaccharide there is used cellulose, examples of the ether derivatives employable herein include methyl cellulose, ethyl cellulose, carboxymethyl cellulose, carboxyethyl cellulose, carboxyethyl-carbamoylethyl cellulose, hydroxymethyl cellulose, hydroxyethyl cellulose, hydroxypropyl cellulose, hydroxypropylmethyl cellulose, hydroxyethylmethyl cellulose, cyanoethyl cellulose, and carbamoylethyl cellulose. Preferred among these ether derivatives are hydroxymethyl cellulose, and hydroxyethyl cellulose. However, the invention is not limited to these ether derivatives, including the kind of polysaccharide and ether.

Those obtained by halogenating the hydroxyl group in any of the aforementioned polysaccharide structures to an arbitrary substitution degree may be preferably used as well.

As the ester derivative of a polymer having a polysaccharide structure there may be preferably used a cellulose ester derivative such as triacetyl cellulose, diacetyl cellulose and monoacetyl cellulose, particularly triacetyl cellulose. More preferably, triacetyl cellulose and diacetyl cellulose are used in admixture.

[Solvent]

Taking cellulose ester derivative as an example, the aforementioned good solvent is a solvent capable of dissolving cellulose ester derivative. Examples of the good solvent employable herein include halogenated hydrocarbons such as methylene chloride (=dimethyl chloride) and chloroform, esters such as methyl acetate, ethyl acetate, methyl formate and methyl glycol acetate and ketones such as acetone and methyl ethyl ketone. Preferred among these good solvents is methylene chloride.

The aforementioned poor solvent is a solvent having compatibility with the aforementioned good solvent and a higher boiling point than that of the aforementioned good solvent which merely swells cellulose ester derivative but substantially doesn't dissolve cellulose ester derivative. Examples of the poor solvent employable herein include alcohols such as methanol, ethanol and butanol, ethers such as isopropyl alcohol, and tetrahydrofurane. Preferred among these poor solvents is methanol.

The aforementioned non-solvent is a solvent having compatibility with the aforementioned good solvent or poor solvent and a higher boiling point than that of the good solvent which doesn't dissolve or swell cellulose ester derivative. Specific examples of the non-solvent employable herein include hydrocarbons such as heptane, decane and toluene, polyvalent alcohols such as ethylene glycol and ethylene glycol monoethyl ether, ethers of polyvalent alcohols, and water. Preferred among these non-solvents is water.

The ratio of the amount of good solvent to poor solvent may be predetermined to a range of from 5:5 to 8:2, preferably from 6:4 to 7:3. The non-solvent may be incorporated in an amount of from 1 to 8% by mass, preferably from 4 to 6% by mass. (In this specification, % by mass is equal to % by weight.) The cellulose ester derivative is dissolved in this mixed solvent in a concentration of from 1 to 30%, preferably from 5 to 10%.

For the details of the method of using the solvent, particularly good solvent and poor solvent, reference can be made to JP-B-55-31418, JP-A-50-12256, JP-A-51-76360, etc.

The aforementioned dope may comprise various additives (e.g., plasticizer, antistatic agent, deterioration inhibitor, ultraviolet inhibitor, surface active agent, release agent, colorant, reinforcing agent, crosslinking agent) incorporated therein depending on the purpose. These additives may be added at any time during the preparation of the dope. However, the final step in the preparation of the dope may include a step of adding additives. Alternatively, the membrane thus prepared may be impregnated with these additives.

The aforementioned dope is preferably filtered through a filter paper, and then deaerated.

[Preparation of Microporous Membrane]

An embodiment of implementation of the method of producing a porous membrane of the invention will be described hereinafter in connection with the attached drawings.

Figure 1:
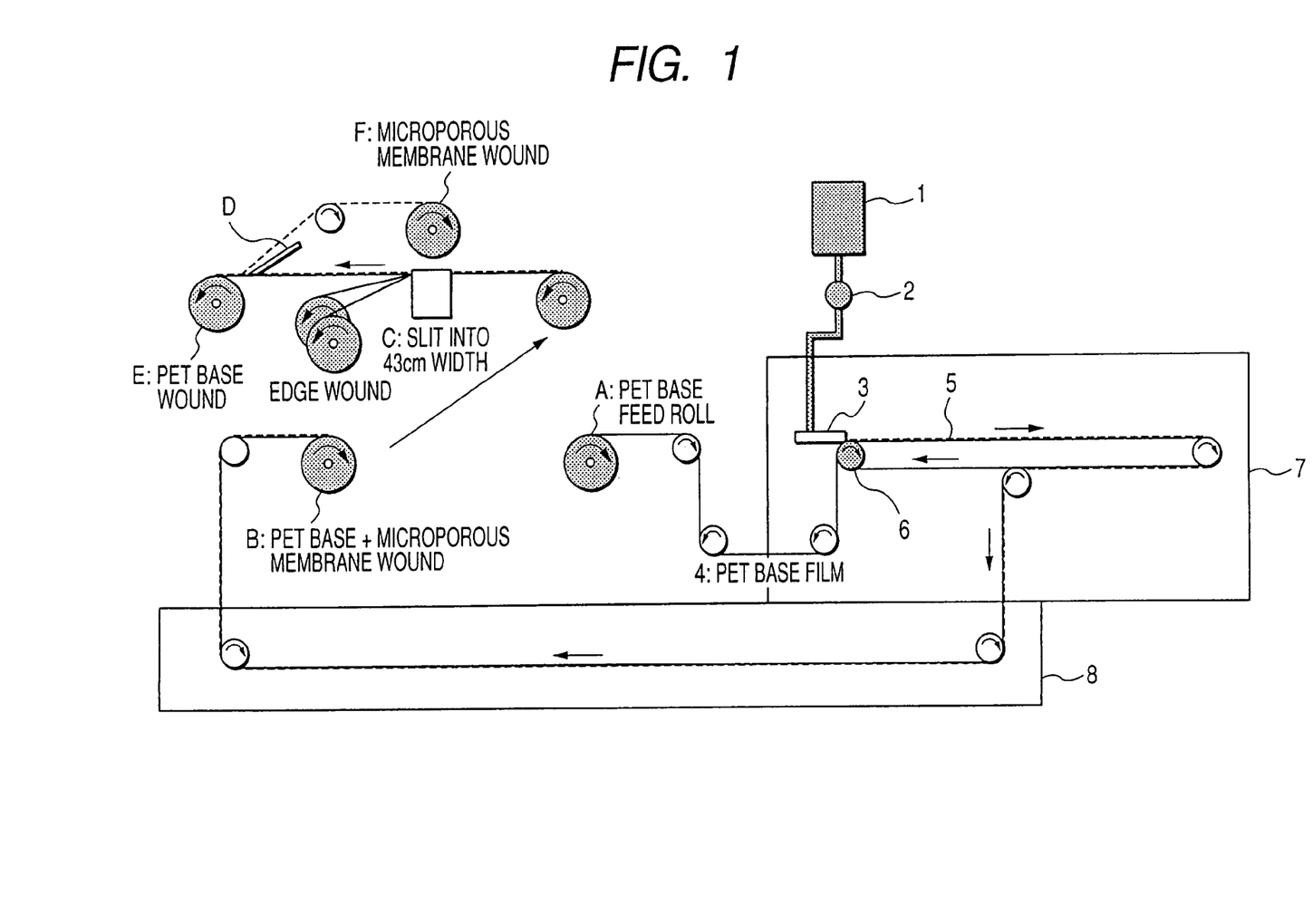
FIG. 1 is a schematic diagram of productive facilities embodying the method of producing a porous membrane of the invention.

FIG. 1 is a schematic diagram of productive facilities embodying the method of producing a porous membrane of the invention.

Explaining the operation of the productive facilities, the dope which is being supplied by a feed pump (2) from a dope tank (1) is casted through a casting die (3) over a polyethylene terephthalate (PET) base film (4) which is being conveyed onto an endless band (5) in a casting device from a PET base feed roll (A), and then dried. The cast film thus formed is peeled off the endless band (5) together with PET, dried in a drying device (8), and then wound on a roll (B) for winding PET base and microporous membrane.

In the productive facilities, the dope is controlled to a predetermined temperature within ±3.0° C. in the dope tank (1) equipped with a temperature controller. Subsequently, the dope which has been controlled to a substantially constant temperature is fed from the dope tank (1) by the feed pump (2), and then casted through the casting die (3) over the PET base film (4) which is being conveyed onto the casting belt. During this procedure, the temperature of the casted surface of the PET base film is controlled to a constant value within ±3.0° C. lower than the temperature of the dope.

The temperature of the dope is preferably controlled to a constant value in a range of from 5° C. to 50° C., more preferably constant value within ±3.0° C. in a range of from 15° C. to 40° C., e.g., 35.0° C.±3.0° C.

In order to accurately control the temperature of the dope in the dope tank to a constant value within ±3.0° C., the dope tank may be equipped with a temperature controller.

To this end, as the dope tank there may be used a stainless steel vessel with a jacket that allows a liquid medium having a constant temperature to flow around the vessel. To the stainless steel vessel may be connected a constant temperature circulating device having a temperature precision of ±2.0° C. and a circulating pump capacity of 10 l/min or more (e.g., Type NCC-2100, produced by TOKYO RIKAKIKAI CO., LTD.) so that a liquid medium having a constant temperature can be circulated through the stainless steel vessel. Alternatively, a pump having a circulating pump capacity of 10 l/min or more can be connected to a tank the temperature precision of which is controlled to ±2.0° C. so that a liquid medium having a constant temperature can be circulated through the tank. However, the invention is not limited to these configurations so far as the temperature of the dope in the dope tank can be controlled to a constant value within ±3.0° C.

The temperature of the casted surface is preferably controlled to a constant value within ±3.0° C., e.g., 10.0° C.±3.0° C. in a range of from −10° C. to 47° C., which is from 3° C. to 60° C. lower than the temperature of the dope, more preferably from 0° C. to 45° C., which is from 5° C. to 50° C. lower than the temperature of the dope, even more preferably from 15° C. to 25° C., which is from 5° C. to 15° C. lower than the temperature of the dope.

In order to accurately control the temperature of the casted surface to a constant value within ±3.0° C., the conveying drum disposed at the position where the dope is casted through the casting die over the PET base film (4) may be provided with a temperature controller capable of accurately controlling the temperature of the surface of the drum to a constant value within ±3.0° C.

To this end, as the conveying drum there may be used one having a double hollow drum structure comprising a gap between the outer hollow drum and the inner hollow drum and a hole formed at the end of the inner drum for allowing the passage of a liquid. To the conveying drum is connected a constant temperature circulating device having a temperature precision of ±2.0° C. and a circulating pump capacity of 10 l/min or more (e.g., Type NCC-2100, produced by TOKYO RIKAKIKAI CO., LTD.). In this arrangement, a liquid medium flows from the bearing into the gap between the outer drum and the inner drum from which it enters the inner drum at the end thereof. The liquid medium is then discharged to the bearing. Thus, a liquid medium having a constant temperature can be circulated. Alternatively, a pump having a circulating pump capacity of 10 l/min or more can be connected to a tank the temperature precision of which is controlled to ±2.0° C. In this arrangement, a liquid medium flows from the bearing into the gap between the outer drum and the inner drum from which it enters the inner drum at the end thereof. The liquid medium is then discharged to the bearing. Thus, a liquid medium having a constant temperature can be circulated. However, the invention is not limited to these structures so far as the temperature of the conveying drum can be controlled to a constant value within ±3.0° C.

By thus accurately controlling both the temperature of the dope and the casted surface to a constant value within ±3.0° C., the longitudinal locality of properties such as pore diameter of the microporous membrane thus produced can be eliminated, making it possible to obtain a nucleic acid-adsorbable microporous membrane having a more stable quality than ever.

The microporous membrane thus casted is then subjected to drying. Referring to the drying conditions, the microporous membrane is preferably dried at a temperature of from 30° C. to 110° C. for 15 to 50 minutes, more preferably from 40° C. to 100° C. for 20 to 40 minutes.

The microporous membrane thus dried is then wound on the winding roll (B).

[Saponification of Microporous Membrane]

The microporous membrane according to the invention is preferably a saponified microporous membrane of cellulose ester derivative.

The saponified microporous membrane of cellulose ester derivative is preferably a surface-saponified microporous acetyl cellulose membrane. As previously mentioned, the acetyl cellulose may be any of monoacetyl cellulose, diacetyl cellulose and triacetyl cellulose, particularly triacetyl cellulose. More preferably, triacetyl cellulose and diacetyl cellulose is used in admixture.

In order to prepare the saponified microporous membrane, the membrane structure is preferably subjected to saponification with an alkaline saponifying solution (e.g., NaOH, KOH) only on the surface thereof in contact with the alkaline saponifying solution. The material of the membrane structure does not need to be changed from acetyl cellulose. The amount (density) of spatial hydroxyl groups can be controlled by the degree of surface saponification (percent surface saponification) and the structure of microporous membrane. Since the membrane structure is formed by an acetyl cellulose, a firm phase can be obtained. The surface saponification of the acetyl cellulose for the purpose of introducing hydroxyl groups into only the surface of the membrane structure means that only the surface of the membrane structure is rendered cellulosic with the structure left unchanged from acetyl cellulose. A cellulose, if used as a raw material, cannot be liquefied, making it possible to produce a porous membrane or flat membrane on an industrial basis.

For example, as a microporous triacetyl cellulose membrane there is commercially available a Type FM500 microfilter (produced by Fuji Photo Film Co., Ltd.).

In order to subject the microporous membrane to surface saponification, the microporous membrane is dipped in an alkaline aqueous solution. In order to change the percent surface saponification, the concentration of the alkaline aqueous solution or the dipping time may be changed. For example, the microporous membrane may be dipped in an aqueous solution of sodium hydroxide having a concentration of from 0.1 to 1.0 mol/l for 10 to 120 minutes.

The percent saponification can be easily measured by any known method. For example, the amount of residual acetyl groups may be quantitatively determined by a titrimetric acetylation degree measuring method or a structural analysis using a measuring instrument such as NMR, IR and XPS.

In the case where a saponified microporous membrane is used to separate nucleic acid, the number of hydroxyl groups in the microporous membrane is preferably as great as possible to raise the efficiency of separating nuclei acid. For example, the microporous membrane made of an acetyl cellulose such as triacetyl cellulose preferably exhibits a percent surface saponification of from about 5% to 100%, more preferably 10% or more. The microporous membrane having a percent surface saponification falling within the above defined range exhibits a sufficient adsorptivity when used as an adsorption material for separating and purifying nucleic acid. In order to attain the above defined percent saponification, the time during which the microporous membrane is dipped in a 0.4 mol/l aqueous solution of sodium hydroxide is preferably 10 minutes or more.

[Saponifying Device]

Hereinafter, an embodiment of executing saponification of a microporous cellulose will be described with reference to drawings.

Figure 2:
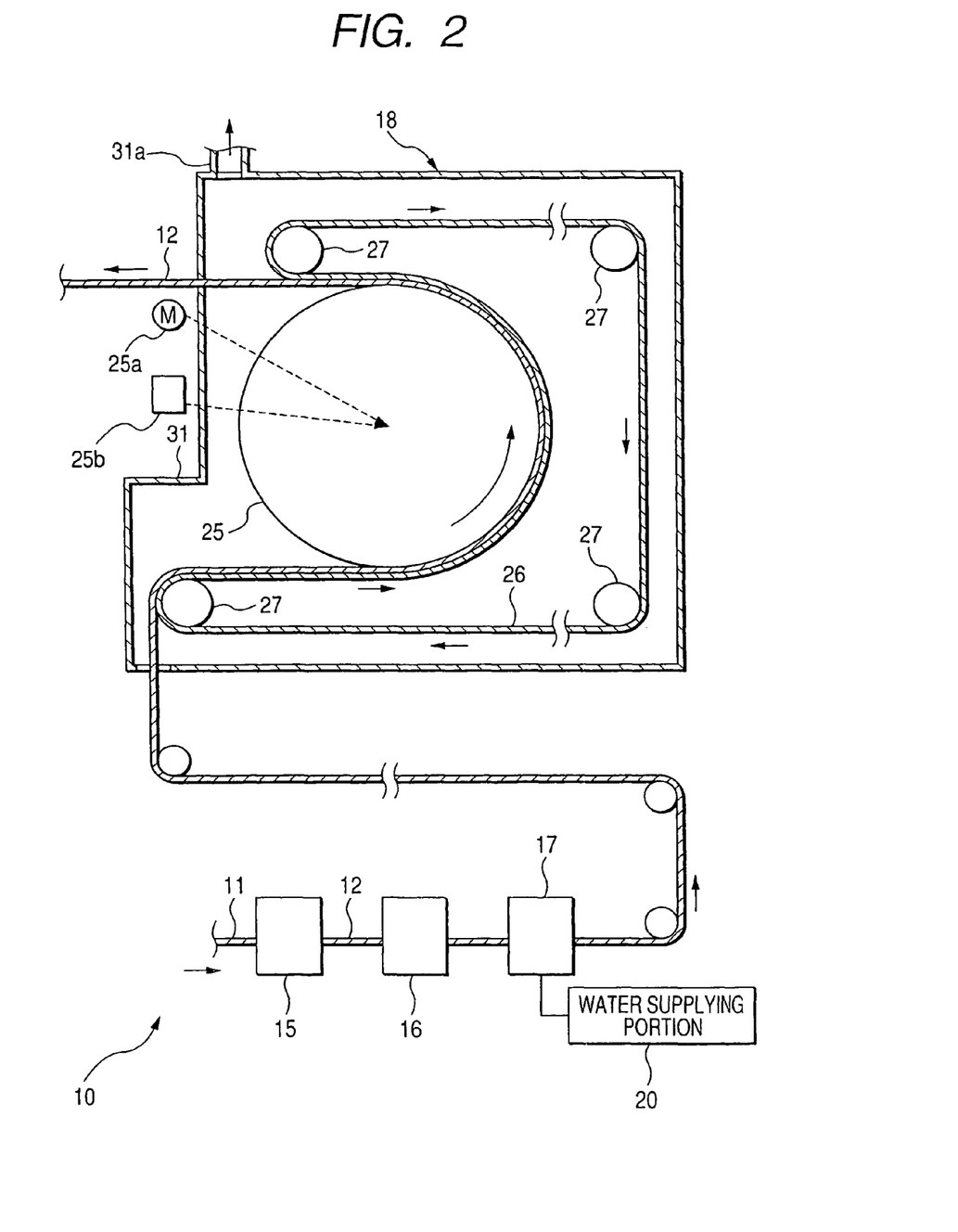
FIG. 2 is a schematic diagram of a device for saponifying a microporous cellulose ester membrane.

FIG. 2 is a schematic diagram of a device for saponifying a microporous cellulose ester membrane. The saponifying device 10 is arranged to subject a microporous cellulose ester membrane 11 (hereinafter occasionally simply referred to as "cellulose ester membrane") to predetermined treatment while being sequentially conveyed in the form of sheet or continuously conveyed in continuous form so that a saponified membrane 12 is formed. The saponifying device 10 comprises a saponifying unit 15, a neutralizing unit 16, a rinsing unit 17 and a drying unit 18.

The saponifying unit 15 has a saponifying tank (not shown) provided therein. The saponifying tank is provided with an alkaline aqueous solution for saponifying the cellulose ester membrane 11 to form a saponified membrane 12.

The neutralizing unit 16 has a neutralizing layer (not shown) provided therein. The neutralizing layer has an acidic aqueous solution provided therein for neutralizing the alkaline aqueous solution left on the surface or in the interior of the saponified membrane 12 produced by saponification.

The rinsing unit 17 is provided with a rinsing machine having an agitator (not shown). The rinsing machine has a water suction port and a water discharge port provided therein. Washing water is properly supplied from a water supplying portion 20 into the rinsing machine through the water suction port. Only used water is properly discharged out of the rinsing machine through the water discharge port.

The drying unit 18 comprises a drum 25 as a heating unit for heating the saponified membrane 12. The drying unit 18 also has a belt 26 that conveys the saponified membrane 12 so that the saponified membrane 12 is interposed between the drum 25 and the belt 26 to raise the efficiency of heating the saponified membrane 12. The drying unit 18 further has a conveying roller 27 for moving the belt 26. The drum 25 is provided with a motor 25a for rotationally driving the drum 25 and a temperature controller 25b for detecting the surface temperature of the drum 25 and controlling the surface temperature of the drum 25 on the basis of the results of detection. The drying unit 18 further comprises a chamber 31 having a discharge port 31a formed therein for discharging the internal air. The intake of air into the chamber 31 is made at the inlet of the chamber 31 through which the saponified membrane 12 enters the chamber 31.

In the saponifying unit 15, the cellulose ester membrane 11 is saponified with an alkaline aqueous solution. By way of example, the cellulose ester membrane 11 is dipped in an aqueous solution of sodium hydroxide having a concentration of from 0.1 to 1.0 mol/l with stirring at ordinary temperature (15° C. to 35° C.) for 10 to 120 minutes.

The membrane 12 thus saponified is preferably subjected to neutralization as soon as possible after saponification. The concentration and kind of the acid to be used at the neutralizing step and the neutralizing time may be arbitrary so far as they are enough to neutralize the alkaline aqueous solution which has been attached to the membrane 12 at the saponifying step. For example, the saponified membrane may be dipped in an aqueous solution having a concentration of from 0.1 to 1.0 mol/l for 10 to 60 minutes to undergo neutralization. The neutralization of the saponified membrane may be carried out also by any other methods such as spraying an acidic aqueous solution onto the saponified membrane 12.

Subsequently, the saponified membrane 12 is thoroughly rinsed in the rinsing unit 17. Water is continuously supplied and discharged so that washing can be effected in a stream of water. In accordance with this running water process, the washing efficiency and washing effect can be enhanced. The rinsing time is preferably 60 minutes or more in the case of running water process. In the case of retentive process, rinsing is preferably effected for longer than 60 minutes while renewing water properly.

The water to be used in washing is filtered water. This filtered water is free of nuclease and particles having a particle diameter of 0.5 µm or more. A nuclease is an enzyme capable of cleaving DNA and RNA. The use of nuclease-free water as washing water makes it possible to prevent the drop of yield in the separation and purification of nucleic acid.

In the present embodiment, the use of nuclease-free water as not only washing water for the rinsing step but also all other treatment solutions, including alkaline aqueous solution for the saponifying step and acidic aqueous solution for the neutralizing step makes it possible to prevent more certainly the drop of yield in the separation and purification of nucleic acid.

The washing water may be mixed with a water-soluble organic solvent. The water-soluble organic solvent is preferably selected from the group consisting of methanol, ethanol, propanol, butanol and isomers thereof. A plurality of water-soluble organic solvents may be selected.

The drying step using the drying unit 18 will be described hereinafter. The heating unit to be used in the present embodiment is a contact type drum 25 as mentioned above. The belt 26 which is being continuously circulated by the conveying rollers 27 extends around the drum 25. The saponified membrane 12 which has passed through the rinsing unit 17 is taken to the belt 26 by the conveying roller 21, etc. Subsequently, the saponified membrane 12 is guided by the belt 26 to the drum 25 the surface of which is heated. On the drum 25, the saponified membrane 12 is then heated. During heating, the saponified membrane is conveyed while being interposed between the drum 25 and the belt 36. The saponified membrane continues to be dried over the heated belt 26 even after being separated from the drum 25. Thus, the saponified membrane is thoroughly dried by the time at which it comes out of the chamber 31. When the saponified membrane passes through the drying step, a microporous cellulose membrane is obtained.

By thus heating the saponified membrane while being interposed between the drum and the belt, the efficiency of heating the saponified membrane 12 can be enhanced. At the same time, the break of the membrane and other troubles can be prevented. This is because this heating process allows the inhibition of the shrinkage of the saponified membrane 12 accompanying the evaporation of water content from the saponified membrane 12. The break of the saponified membrane is attributed to the shrinkage of the saponified membrane. Accordingly, in accordance with the present embodiment, the break of the saponified membrane which has heretofore occurred when the saponified membrane is dried while being conveyed by a frame retaining process involving the retention of the membrane at the sides thereof can be prevented.

The temperature of the drum 25 is determined by the thickness of the saponified membrane 12, the water content in the saponified membrane 12, the conveying speed, etc. The conveying speed is determined taking into account the strength of the saponified membrane 12, etc. The surface temperature of the drum 25 is preferably from about 100° C. to 200° C. The conveying speed is preferably from 0.05 to 5.0 m/min. When the surface temperature of the drum 25 falls below 100° C., the saponified membrane 12 is insufficiently heated and thus cannot be thoroughly dried. On the contrary, when the surface temperature of the drum 25 exceeds 200° C., the saponified membrane 12 can be deteriorated. Further, when the conveying speed falls below 0.05 m/min, it is disadvantageous in productivity. On the contrary, when the conveying speed exceeds 5.0 m/min, it is disadvantageous in that underdrying can occur.

Further, when the saponified membrane 12 is heated and dried while being conveyed interposed between the drum and the belt, the resulting saponified membrane 12 can be provided with a high flatness. Since the saponified membrane 12 has such a high flatness, sheets obtained by cutting the saponified membrane 12 into a predetermined size can be fairly received into a cartridge for separating and purifying nucleic acid.

[Properties of Microporous Membrane]

The minimum pore diameter of the microporous membrane according to the invention is normally from about 0.01 µm to 8 µm. However, the minimum pore diameter of the microporous membrane of the invention, if used for separation and purification of nucleic acid, is preferably 0.1 µm or more, more preferably from 0.5 µm to 5 µm from the standpoint of efficiency of extracting nucleic acid.

For the measurement of the minimum pore diameter of the microporous membrane, a bubble point method may be employed.

Referring to the shape of the pores in the microporous membrane according to the invention, there may be various configurations. For example, the shape of the pores in the microporous membrane may be symmetric or asymmetric from one side to the other. However, the shape of the pores in the microporous membrane, if used for separation and purification of nucleic acid, is preferably asymmetric from one side to the other from the standpoint of prevention of clogging.

The ratio of maximum pore diameter to minimum pore diameter of the microporous membrane according to the invention, if used for separation and purification of nucleic acid, is preferably 2 or more, more preferably 5 or more from the standpoint of adsorption of nucleic acid to membrane and prevention of clogging.

For the measurement of the maximum pore diameter of the microporous membrane, an electron microscope may be used.

The thickness of the microporous membrane according to the invention, if used for separation and purification of nucleic acid, is preferably from 10 µm to 500 µm, more preferably from 50 µm to 250 µm from the standpoint of membrane washing.

For the measurement of the thickness of the microporous membrane, a thickness meter such as digimatic indicator may be used.

The void ratio of the microporous membrane according to the invention, if used for separation and purification of nucleic acid, is preferably from 50% to 95%, more preferably from 65% to 80% from the standpoint of prevention of clogging and recovery of nucleic acid.

For the determination of the void ratio, the membrane density may be subjected to calculation.

The bubble point of the microporous membrane according to the invention, if used for separation and purification of nucleic acid, is preferably from 0.1 to 10 $kgf/cm^2$, more preferably from 0.2 to 4 $kgf/cm^2$ from the standpoint of prevention of clogging and recovery of nucleic acid.

For the measurement of bubble point, a bubble point method may be employed.

The pressure loss of the microporous membrane according to the invention, if used for separation and purification of nucleic acid, is preferably from 0.1 kPa to 100 kPa, more preferably from 0.5 kPa to 50 kPa from the standpoint of automation using a pressurization system.

For the measurement of pressure loss, a differential pressure gauge may be used.

The water permeability of the porous membrane according to the invention, if used for separation and purification of nucleic acid, at a temperature of 25° C. and a pressure of 1 $kg/cm^2$ is preferably from 1 to 5,000 $ml/cm^2$ per minute, more preferably 5 to 1,000 $ml/cm^2$ per minute from the standpoint of automation using a pressurization system.

The microporous membrane according to the invention can be more preferably used in a method of separating and purifying nucleic acid when the properties thereof fall within the above defined range.

The microporous membrane according to the invention preferably exhibits a nucleic acid adsorption of 0.1 µg or more, more preferably 0.9 µg or more per mg of porous membrane when used in a method of separating and purifying nucleic acid.

[Method of Separating and Purifying Nucleic Acid]

The microporous membrane according to the invention is used in a method of separating and purifying nucleic acid comprising the following various steps.

(1) Step of passing a sample solution containing a nucleic acid through the porous membrane to allow the nucleic acid to be adsorbed to the interior of the porous membrane;

(2) Step of passing a washing solution through the porous membrane to wash the porous membrane with the nucleic acid kept adsorbed thereto; and (3) Step of passing a recovering solution through the porous membrane to allow the nucleic acid to be desorbed from the interior of the porous membrane.

The term "nucleic acid" as used herein is meant to indicate either a single-stranded or double-stranded nucleic acid. The molecular weight of the nucleic acid is not limited.

In the method of separating and purifying nucleic acid, a nucleic acid separating and purifying unit having a solid phase made of a microporous membrane received in a container having at least two openings is preferably used to effect the adsorption and desorption of nucleic acid.

More preferably, a nucleic acid separating and purifying unit comprising (a) a solid phase made of a microporous membrane, (b) a container having at least two openings that receives the solid phase and (c) a pressure difference generator connected to one of the openings of the container is used to effect the adsorption and desorption of nucleic acid.

A first embodiment of the aforementioned method of separating and purifying nucleic acid may comprise the following steps:
(a) Step of inserting one of the openings of the nucleic acid separating and purifying unit into a sample solution containing nucleic acid;
(b) Step of sucking the sample solution containing nucleic acid with the pressure in the container reduced using the pressure difference generator connected to the other opening of the nucleic acid separating and purifying unit and allowing the sample solution to come in contact with the solid phase made of a microporous membrane;
(c) Step of discharging the sample solution containing nucleic acid thus sucked out of the container with the pressure in the container raised using the pressure difference generator connected to the other opening of the nucleic acid separating and purifying unit;
(d) Step of inserting one of the openings of the nucleic acid separating and purifying unit into a nucleic acid washing buffer solution;
(e) Step of sucking the nucleic acid washing buffer solution with the pressure in the container reduced using the pressure difference generator connected to the other opening of the nucleic acid separating and purifying unit and allowing the nucleic acid washing buffer solution to come in contact with the solid phase made of a microporous membrane;
(f) Step of discharging the nucleic acid washing buffer solution thus sucked out of the container with the pressure in the container raised using the pressure difference generator connected to the other opening of the nucleic acid separating and purifying unit;
(g) Step of inserting one of the openings of the nucleic acid separating and purifying unit into a solution capable of desorbing the nucleic acid adsorbed to the solid phase made of a microporous membrane;
(h) Step of sucking the solution capable of desorbing the nucleic acid adsorbed to the solid phase made of a microporous membrane with the pressure in the container reduced using the pressure difference generator connected to the other opening of the nucleic acid separating and purifying unit and allowing the solution capable of desorbing the nucleic acid adsorbed to the solid phase made of a microporous membrane to come in contact with the solid phase made of a microporous membrane; and
(i) Step of discharging the solution capable of desorbing the nucleic acid adsorbed to the solid phase made of a microporous membrane out of the container with the pressure in the container raised using the pressure difference generator connected to the other opening of the nucleic acid separating and purifying unit A second embodiment of the aforementioned method of separating and purifying nucleic acid may comprise the following steps:
(a) Step of preparing a sample solution containing nucleic acid from a test sample and injecting the sample solution containing nucleic acid into one of the openings of the nucleic acid separating and purifying unit;
(b) Step of discharging the sample solution containing nucleic acid thus injected out of the container through the other opening with the pressure in the container raised using a pressure difference generator connected to one of the openings of the nucleic acid separating and purifying unit so that the sample solution comes in contact with the solid phase made of a microporous membrane;
(c) Step of injecting a nucleic acid washing buffer into one of the openings of the nucleic acid separating and purifying unit;
(d) Step of discharging the nucleic acid washing buffer thus injected out of the container through the other opening with the pressure in the container raised using a pressure difference generator connected to one of the openings of the nucleic acid separating and purifying unit so that the nucleic acid washing buffer comes in contact with the solid phase made of a microporous membrane;
(e) Step of injecting a solution capable of desorbing the nucleic acid adsorbed to the solid phase made of a microporous membrane into one of the openings of the nucleic acid separating and purifying unit; and
(f) Step of discharging the solution capable of desorbing the nucleic acid adsorbed to the solid phase made of a microporous membrane out of the container through the other opening with the pressure in the container raised using the pressure difference generator connected to the other opening of the nucleic acid separating and purifying unit so that the nucleic acid adsorbed to the solid phase made of a microporous membrane is desorbed from the solid phase and discharged out of the container The method of separating and purifying nucleic acid using a microporous membrane will be further described hereinafter. Preferably, a sample solution containing nucleic acid is allowed to come in contact with a solid phase made of a microporous membrane so that the nucleic acid in the sample solution is adsorbed to the solid phase. Subsequently, the nucleic acid adsorbed to the solid phase is desorbed from the solid phase with a desirable solution described later. More preferably, the sample solution containing nucleic acid is a solution obtained by adding a water-soluble organic solvent to a dispersion of nucleic acid obtained by treating a test sample containing cells or viruses with a solution capable of dissolving cell membrane and nuclear envelope therein.

The sample solution containing nucleic acid to be used herein is not limited. In the art of diagnosis, however, a body fluid such as whole blood, plasma, serum, urea, excreta and saliva or a biological material such as vegetable (or part thereof), animal (or part thereof) or solution or homoginate thereof can be a sample solution.

Firstly, the test sample is treated with an aqueous solution containing a reagent capable of dissolving cell membrane to solubilize nuclear envelope. In this manner, cell membrane and nuclear envelope are dissolved to cause nucleic acid to be dispersed in the aqueous solution. In order to dissolve cell membrane and solubilize nuclear envelope, in the case where the sample in question is whole blood, (1) removal of red corpuscle, (2) removal of various proteins and (3) dissolution of white corpuscle and nuclear envelope are needed. The removal of red corpuscle (1) and the removal of various proteins (2) are needed to prevent nonspecific adsorption of white corpuscle to solid phase and clogging of porous membrane. The dissolution of white corpuscle and nuclear envelope (3) is needed to solubilize the nucleic acid to be extracted. In particular, the dissolution of white corpuscle and nuclear envelope (3) is an important step at which nucleic acid is needed to be solubilized. In the example described hereinbelow, when the test sample is incubated with guanidine hydrochloride, Triton X-100 and protease (produced by SIGMA CORPORATION) at 60° C. for 10 minutes, the aforementioned requirements (1), (2) and (3) can be met at the same time.

As the nucleic acid solubilizing reagent there may be used a solution containing a guanizind salt, a surface active agent and a proteolytic enzyme. As the guanidine salt there is preferably used guanidine hydrochloride. However, other guanidine salts (guanidine isothiocyanate, guanidine thiocyanate) may be used. The concentration of guanidine salt in the solution is from not smaller than 0.5M to not greater than 6M, preferably from not smaller than 1M to not greater than 5M.

As the surface active agent there may be used Triton X-100. Besides Triton X-100, anionic surface active agents such as SDS, sodium cholate and sodium sarcosinate, nonionic surface active agents such as Tween 20 and Megafac and other various amphoteric surface active agents may be used. Nonionic surface active agents such as polyoxyethylene octyl phenyl ether (Triton X-100) are preferably used. The concentration of surface active agent in the solution is normally preferably from 0.05% to 10% by mass, particularly from 0.1% to 5% by mass.

As the proteolytic enzyme there may be used Protease K. However, other proteases may be used. A protease is an enzyme and thus is preferably heated to a temperature of from 37° C. to 70° C., particularly from 50° C. to 65° C.

To the aqueous solution having a nucleic acid thus dispersed therein is then added a water-soluble organic solvent so that the nucleic acid is allowed to come in contact with the microporous membrane. In this manner, the nucleic acid in the sample solution is adsorbed to the microporous membrane. In order to cause the nucleic acid solubilized in the procedure described above herein to be adsorbed to the solid phase made of microporous membrane, it is necessary that the mixed nucleic acid solution thus solubilized be mixed with a water-soluble organic solvent and the mixed nucleic acid solution have salts present therein.

In other words, when the hydration structure of water molecules present around a nucleic acid is destroyed, the nucleic acid is solubilized in unstable state. It is thought that when the nucleic acid in this state comes in contact with the solid phase made of microporous membrane, the polar group on the surface of the nucleic acid and the polar group on the surface of the solid phase undergo mutual interaction to cause the nucleic acid to be adsorbed to the surface of the solid phase. By mixing the mixed nucleic acid solution thus solubilized with a water-soluble organic solvent and allowing the presence of salts in the resulting mixed nucleic acid solution, the nucleic acid can be rendered unstable.

Examples of the water-soluble organic solvent employable herein include ethanol, isopropanol, and propanol. Preferred among these water-soluble organic solvents is ethanol. The concentration of water-soluble organic solvent is preferably from 5% by mass to 90% by mass, more preferably from 20% by mass to 60% by mass. The concentration of ethanol is preferably as high as possible so far as no agglomerates are produced.

Preferred examples of the salt to be present in the mixed nucleic acid thus obtained include various caotropic materials (guanidium salt, sodium iodide, sodium perchlorate), sodium chloride, potassium chloride, ammonium chloride, sodium bromide, potassium bromide, calcium bromide, and ammonium bromide. In particular, guanidium salts are preferred because they have both effects of dissolving cell membrane and solubilizing nucleic acid.

Subsequently, the microporous membrane having a nucleic acid adsorbed thereto is brought into contact with a nucleic acid washing buffer solution. This nucleic acid washing buffer solution is capable of washing the microporous membrane to remove impurities in the sample solution adsorbed to the microporous membrane together with the nucleic acid. Accordingly, the nucleic acid washing buffer solution needs to have a composition such that the nucleic acid cannot be desorbed from the microporous membrane but impurities can be desorbed from the microporous membrane. The nucleic acid washing buffer solution is composed of an aqueous solution containing a main agent, a buffer and optionally a surface active agent. As the main agent there may be used an aqueous solution of methanol, ethanol, isopropanol, n-isopropanol, butanol, acetone or the like having a concentration of from about 10% to 100% by mass (preferably from about 20% to 100% by mass, more preferably from about 40% to 80% by mass). As the buffer and surface active agent there may be used existing buffer and surface active agent, respectively. Preferred among these nucleic acid washing buffer solutions is a solution containing ethanol, Tris and Triton X-100. The concentration of Tris and Triton X-100 are preferably from 10 mM to 100 mM and from 0.1% to 10% by mass, respectively.

Subsequently, the aforementioned microporous membrane thus washed is brought into contact with a solution capable of desorbing the nucleic acid adsorbed to the microporous membrane. The solution with which the microporous membrane has been brought into contact contains the desired nucleic acid. Therefore, this solution is recovered and provided for the subsequent procedure, e.g., nucleic acid amplification by PCR (polymerase chain reaction). As the solution capable of desorbing nucleic acid there is preferably used a solution having a low salt concentration, particularly 0.5 M or less. As such a solution there may be used purified distilled water, TE buffer or the like.

[Nucleic Acid Separating and Purifying Unit]

The nucleic acid separating and purifying unit has a solid phase made of microporous membrane received in a container having at least two openings. The material constituting the container is not specifically limited so far as it allows the reception of a microporous membrane and the provision of at least two openings. Plastic is preferred from the standpoint of ease of production. For example, a transparent or opaque resin such as polystyrene, polymethacrylic acid ester, polyethylene, polypropylene, polyester, nylon and polycarbonate is preferably used.

Figure 3:
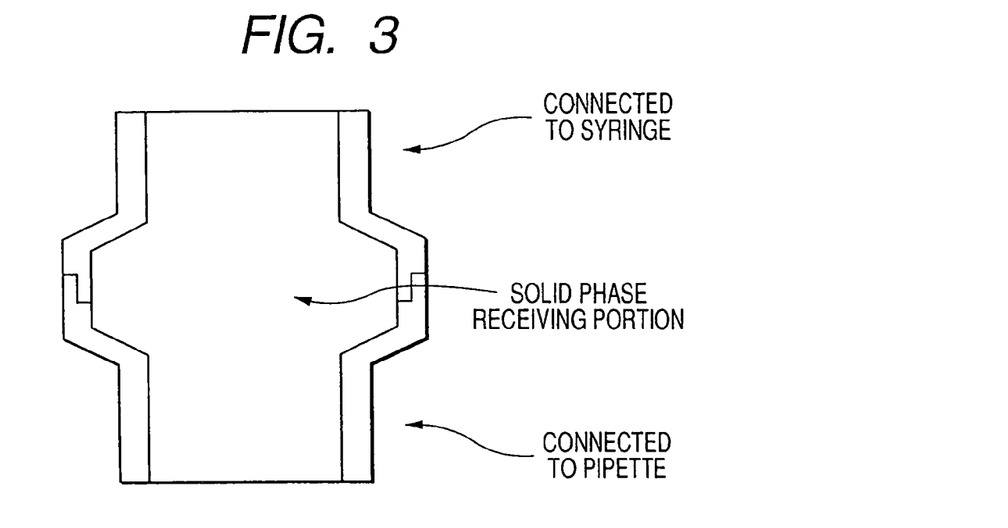
FIG. 3 is a conceptional diagram of a nucleic acid separating and purifying unit.

A conceptional diagram of the container is shown in FIG. 3. Essentially, it may suffice if the container has a solid phase receiving portion capable of receiving the solid phase, can prevent the solid phase from coming out of the receiving portion during suction and discharge of the sample solution, etc. and is arranged to have a pressure difference generator such as syringe connected thereto at the opening thereof. To this end, the container preferably consists of two parts which are joined together after receiving the solid phase. Further, in order to prevent the solid phase from coming out of the receiving portion, a mesh made of a material that doesn't contaminate DNA may be provided on the top and bottom of the solid phase.

The shape of the microporous membrane to be received in the aforementioned container, too, is not specifically limited. The shape of the microporous membrane may be circle, square, rectangle, ellipse, cylinder, coil or any other arbitrary shape. From the standpoint of producibility, the microporous membrane preferably has a shape having a high symmetry such as circle, square, cylinder and coil.

One of the openings of the aforementioned container is inserted into the sample solution containing nucleic acid while the sample solution is sucked through the other opening so that the sample solution comes in contact with the microporous membrane. The sample solution is then discharged. Subsequently, the nucleic acid washing buffer solution is sucked and discharged. Subsequently, the solution capable of desorbing the nucleic acid adsorbed to the microporous membrane is sucked and discharged. The solution thus discharged is then recovered to obtain the desired nucleic acid.

The desired nucleic acid can be obtained also by dipping the microporous membrane sequentially in the sample solution containing nucleic acid, the nucleic acid washing buffer solution and the solution capable of desorbing the nucleic acid adsorbed to the microporous membrane.

The nucleic acid separating and purifying unit preferably comprises (a) a solid phase made of microporous membrane, (b) a container having at least two openings for receiving the solid phase and (c) a pressure difference generator connected to one of the openings of the container. The invention will be further described with reference to this nucleic acid separating and purifying unit.

The container is normally prepared in parts, i.e., main body for receiving the solid phase made of microporous membrane and cover body. The two parts each have at least one opening provided therein. One of the openings is used as inlet and outlet for sample solution containing nucleic acid, nucleic acid washing buffer solution and solution capable of desorbing nucleic acid adsorbed to solid phase (hereinafter referred to as "sample solution, etc."). The other opening is connected to a pressure difference generator capable of reducing or raising the pressure in the container. The shape of the main body is not specifically limited. However, the main body preferably has a circular section to facilitate the production thereof and the diffusion of the sample solution, etc. over the entire surface of the solid phase. The section of the main body is also preferably rectangular to prevent the production of cutting wastage of the solid phase.

The aforementioned cover is needed to be connected to the main body in such an arrangement that the pressure in the container can be reduced or raised by the pressure difference generator. Any connecting method may be selected so far as this state can be selected. Examples of the connecting method employable herein include use of adhesive, screwing, fitting, and fusion by ultrasonic heating.

The inner capacity of the container is determined only by the amount of the sample solution to be treated but is normally represented by the volume of the solid phase to be received therein. In some detail, the container preferably has a size great enough to receive from about one to six sheets of solid phase having a thickness of about 1 mm or less (e.g., from about 50 µm to 500 µm) and a diameter of from about 2 mm to 20 mm.

The end of the solid phase is preferably brought into close contact with the inner wall of the container to an extent such that the sample solution, etc. cannot pass through the gap therebetween.

The solid phase disposed opposed to the opening used as inlet for sample solution, etc. is not brought into close contact with the inner wall of the container so that a space is formed therebelow to provide an arrangement allowing the sample solution, etc. to diffuse over the entire surface of the solid phase as uniformly as possible.

On the solid phase disposed opposed to the other opening, i.e., one connected to the pressure difference generator is preferably a member pierced with a hole at substantially the central part thereof. This member has an effect of discharging efficiently the sample solution, etc. while holding the solid phase. This member is preferably shaped funnel-like or cup-like such that the sample solution, etc. gather at the center thereof. The size of the hole, the angle of the slope and the thickness of the member may be properly determined by those skilled in the art taking into account the amount of the sample solution to be treated, etc., the size of the container receiving the solid phase, etc. Between the member and the opening is preferably formed a space for storing the sample solution, etc. that have overflowed the solid phase to prevent the sample solution, etc. from being sucked into the pressure difference generator. The size of the space, too, may be properly determined by those skilled in the art. In order to efficiently collect the nucleic acid, it is preferred that the sample solution containing nucleic acid be sucked in an amount equal to or more than the value allowing the dipping of the entire solid phase therein.

In order to prevent the concentration of the sample solution, etc. only at the portion directly below the suction opening so that the sample solution, etc. can pass through the solid phase relatively uniformly, it is preferred that a space be provided also between the solid phase and the member. To this end, the member preferably has a plurality of protrusions formed thereon facing toward the solid phase. The size and number of these protrusions may be properly determined by those skilled in the art but are preferably determined such that the opening area of the solid phase can be kept as great as possible while keeping a sufficient space between the solid phase and the member.

It goes without saying that when the container has three or more openings formed therein, it is necessary that the extra openings be temporarily closed to allow the suction or discharge of the solution accompanying the reduction or rise of pressure.

In operation, the pressure difference generator firstly reduces the pressure in the container having the solid phase received therein to suck the sample solution containing nucleic acid. Examples of the pressure difference generator employable herein include syringe, pipetter, and pumps capable of sucking and compressing such as Perista pump. Among these pressure difference generators, syringe is suitable for manual operation and pump is suitable for automatic operation. Further, pipetter is advantageous in that it facilitates one-handed operation. Preferably, the pressure difference generator is detachably connected to one of the openings of the container.

The method of purifying nucleic acid using the aforementioned nucleic acid separating and purifying unit will be described hereinafter. Firstly, one of the openings of the aforementioned nucleic acid separating and purifying unit is inserted into a sample solution containing nucleic acid. Subsequently, using the pressure difference generator connected to the other opening of the nucleic acid separating and purifying unit, the pressure in the purifying unit is reduced to suck the sample solution into the container. In this manner, the sample solution comes in contact with the solid phase to cause the nucleic acid in the sample solution to be adsorbed to the solid phase. It is preferred that the sample solution be sucked in an amount such that it comes in contact with almost the entire body of the solid phase during this procedure. However, when the sample solution is sucked into the pressure difference generator, the device is contaminated. Therefore, the sample solution should be sucked in a properly adjusted amount.

After the suction of a proper amount of the sample solution, the pressure in the unit is then raised by the pressure difference generator so that the solution thus sucked is discharged. It is not necessary that there be provided some interval between suction and discharge. The suction of the sample solution may be directly followed by the discharge of the sample solution.

Subsequently, the nucleic acid washing buffer solution is sucked into the container and then discharged in the same pressure reduction and rising operation as mentioned above so that the interior of the container is washed. This nucleic acid washing buffer solution is capable of washing the sample solution left in the container away together with impurities in the sample solution adsorbed to the solid phase together with the nucleic acid. Accordingly, the nucleic acid washing buffer solution needs to have a composition such that the nucleic acid cannot be desorbed from the microporous membrane but impurities can be desorbed from the microporous membrane. The nucleic acid washing buffer solution is composed of an aqueous solution containing a main agent, a buffer and optionally a surface active agent. As the main agent there may be used an aqueous solution of methyl alcohol, ethyl alcohol, butyl alcohol, acetone or the like having a concentration of from about 10% to 90% by mass (preferably from about 50% to 90% by mass). As the buffer and surface active agent there may be used existing buffer and surface active agent, respectively. Preferred among these nucleic acid washing buffer solutions is a solution containing ethyl alcohol, Tris and Triton X-100. The concentration of Tris and Triton X-100 are preferably from 10 mM to 100 mM and from 0.1% to 10% by mass, respectively.

Subsequently, the solution capable of desorbing the nucleic acid adsorbed to the solid phase is introduced into the container and then discharged from the container in the same pressure reduction and rising operation as mentioned above. The solution thus discharged contains the desired nucleic acid. Therefore, this solution can be be recovered and provided for the subsequent procedure, e.g., nucleic acid amplification by PCR (polymerase chain reaction).

Figure 4:
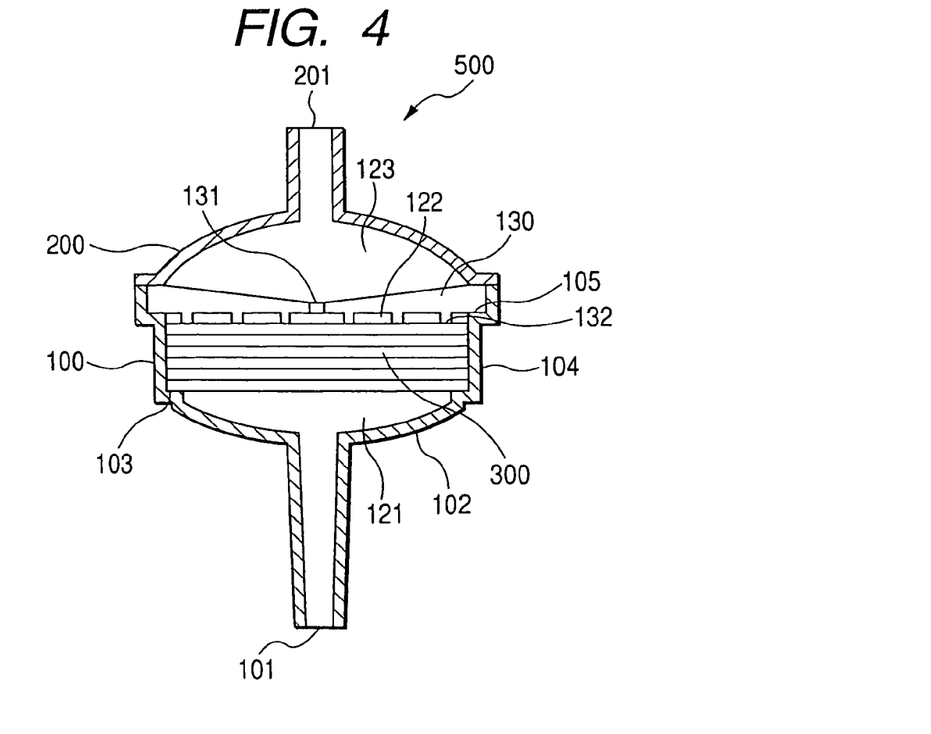

FIG. 4 is a sectional view of an example of the nucleic acid separating and purifying unit. However, the pressure difference generator is not shown. A container 500 for receiving the solid phase comprises a main body 100 and a cover 200 and is formed by a transparent polystyrene. The main body 100 receives a porous membrane made of a surface-saponified triacetyl cellulose as a solid phase 300. The main body 100 also has an opening 101 through which the sample solution, etc. are sucked. A bottom surface 102 extending from the opening is shaped funnel-like. A space 121 is provided between the bottom surface 102 and the solid phase 300. A frame 103 is formed integrally with the bottom surface 102 to support the solid phase 300 and keep the space 121.

The main body has an inner diameter of 20.1 mm, a depth of 5.9 mm and a length of about 70 mm from the bottom surface 102 to the opening 101. The solid phase 300 received in the main body has a diameter of 20.0 mm. The thickness of a sheet of the solid phase 300 is from about 50 μm to 500 μm. By way of example, the thickness of a sheet of the solid phase 300 is 100 μm.

In FIG. 4, a funnel-like press member 130 is provided above the solid phase. The press member 130 has a hole 131 formed at the center thereof and a group of protrusions 132 formed on the lower surface thereof. A space 122 is provided between the press member 130 and the solid phase 300. In order to make it difficult for the sample solution, etc. to leak out through the gap between the solid phase 300 and the wall 104 of the main body 100, the wall 104 is formed in such an arrangement that the diameter of the upper part thereof is greater than the diameter of the solid phase and the end of the press member 130 is put on the step 105.

The cover 200 is connected to the main body 100 by ultrasonic heating. The cover 200 has an opening 21 formed at substantially the central portion thereof to which the pressure difference generator is connected. A space 123 is provided between the cover 200 and the press member 130 for retaining the sample solution, etc. which are flowing out through the hole 131. The space 123 has a capacity of about 0.1 ml.

EXAMPLE

The invention will be further described in the following examples, but the invention should not be construed as being limited thereto.

Example 1

(1) Preparation of Nucleic Acid-Adsorbable Microporous Membrane

A dope of cellulose ester was prepared. Referring to the dissolution method in the preparation of dope, a polymer component was firstly dissolved in dimethyl chloride. Subsequently, to this solution was added methanol by portions. To this solution were then added glycerin and purified water by portions to obtain a dope comprising little undissolved matters incorporated therein. Subsequently, the dope was filtered through a filter paper. The dope had the following formulation.

| | |
|---|---|
| Diacetyl cellulose (acetylation degree: 54.5%) | 2.42% |
| Triacetyl cellulose (acetylation degree: 60.8%) | 3.43% |
| Glycerin | 0.18% |
| Dimethyl chloride | 55.50% |
| Methanol | 33.22% |
| Purified water | 5.05% |

The aforementioned dope was charged into a dope tank ((1) in FIG. 1) with a temperature controller. The dope tank (1) was controlled to 35.0° C.±3.0° C. Subsequently, using a gear pump (2), the dope which had been kept at 35.0° C.±3.0° C. was pumped, filtered, and then casted through a die (3) over a polyethylene terephthalate (PET) film (4) which was being conveyed over an endless band (5). During this procedure, the temperature of the drum (6) was controlled to 10.0° C.±3.0° C. so that the temperature of the casted surface was kept within ±3.0° C. The casted dope (the casted polymer solution) thus formed was then dried with drying air having a temperature of from 20° C. to 40° C. for 20 minutes (as shown by the reference numeral 7), so as to form a cast film.

The cast film was peeled off the endless band (5) together with PET, dried with hot air having a temperature of from 80° C. to 120° C. for 15 minutes (as shown by the reference numeral 8), and then wound by a winding machine (B). On PET was formed a microporous cellulose acetate membrane.

The rolled cast film (B) was passed to an unwinding machine (C) with a slitter where it was then slit into a width of 43 cm. The cellulose acetate film with PET having a width of 43 cm was passed to a peeling bar (D) where it was then divided into PET portion (E) and microporous cellulose acetate membrane (F). The microporous cellulose acetate membrane thus obtained had an average pore diameter of 1.2 μm and an average thickness of 70 μm.

A mixture of 1.5 l of methanol and 13.5 l of nuclease-free water was then absorbed to the microporous cellulose acetate membrane. The microporous cellulose acetate membrane was passed to a saponifying unit 15 where it was then saponified with a 0.4 mol/l aqueous solution of NaOH at a temperature of from 20° C. to 30° C. for 60 minutes.

The neutralization of the microporous cellulose acetate membrane was carried out by dipping the microporous cellulose acetate membrane in a 0.1 mol/l hydrochloric acid having a temperature of from 20° C. to 30° C. in a neutralizing unit 16.

For the rinsing of the microporous cellulose acetate membrane, an autowasher was used as a rinsing unit 17 and nuclease-free water was used as a rinsing water.

Subsequently, the microporous cellulose acetate membrane was dried using a contact type drum drier 18 to obtain the desired nucleic acid-adsorbable microporous membrane.

(2) Preparation of Nucleic Acid Separating and Purifying Cartridge

A container for nucleic acid separating and purifying cartridge having an inner diameter of 7 mm and a portion for receiving nucleic acid-adsorbable microporous membrane was prepared from a high impact polystyrene. Specimens sampled from the microporous membrane (1) at longitudinal positions of 1 m, 50 m, 100 m, 150 m and 200 m were each then received in the container for nucleic acid separating and purifying cartridge at the portion for receiving nucleic acid-adsorbable porous membrane to prepare nucleic acid separating and purifying cartridges.

(3) Preparation of Nucleic Acid Solubilizing Reagent and Washing Solution

A nucleic acid solubilizing reagent solution and a washing solution having the following formulations were prepared.

| (Nucleic acid solubilizing reagent solution) | |
|---|---|
| Guanidine hydrochloride (produced by Life Technology Co., Ltd.) | 382 g |
| Tris (produced by Life Technology Co., Ltd.) | 12.1 g |
| Trion X-100 (produced by ICN) | 10 g |
| Distilled water | 1,000 ml |

| (Washing solution) |
|---|
| 100 mM NaCl |
| 10 mM Tris-HCl |
| 65% ethanol |

(4) Operation for DNA Separation and Purification

To 200 μl of a test sample of whole human blood were added 200 μl of the nucleic acid solubilizing reagent prepared in Example 1 and 20 μl of a protease ("Protease" Type XXIV Bacterial, produced by SIGMA). The test sample was then incubated at 60° C. for 10 minutes. To the test sample thus incubated was then added 200 μl of ethanol with stirring to prepare a sample solution containing a nucleic acid. The sample solution containing a nucleic acid was then injected into each of the nucleic acid separating and purifying cartridges provided with nucleic acid-adsorbable microporous membranes sampled at different longitudinal positions prepared in the step (2) through one of the openings thereof. Subsequently, to the aforementioned opening was connected a pressure difference generator by which the pressure in the nucleic acid separating and purifying unit was then raised to cause the sample solution containing a nucleic acid to pass through the nucleic acid-adsorbable microporous membrane so that it comes in contact with the nucleic acid-adsorbable microporous membrane. The sample solution was then discharged from the nucleic acid separating and purifying cartridge through the other opening thereof. Subsequently, the washing solution prepared in the step (3) was injected into the nucleic acid separating and purifying cartridge through the one of the openings thereof. To the one of the openings of the nucleic acid separating and purifying cartridge through was connected the pressure difference generator by which the pressure in the nucleic acid separating and purifying unit was then raised to cause the washing solution thus injected to pass through the nucleic acid-adsorbable microporous membrane. The washing solution was then discharged from the nucleic acid separating and purifying unit through the other opening thereof. This procedure was repeatedly conducted three times. Subsequently, a recovering solution was injected into the nucleic acid separating and purifying cartridge through the one of the openings thereof. To the one of the openings of the nucleic acid separating and purifying cartridge through was connected the pressure difference generator by which the pressure in the nucleic acid separating and purifying unit was then raised to cause the recovering solution thus injected to pass through the nucleic acid-adsorbable microporous membrane. The recovering solution was discharged from nucleic acid separating and purifying unit through the other opening thereof, and then recovered. The time required for the sample solution containing a nucleic acid to pass through the nucleic acid-adsorbable microporous membrane was recorded on each of these nucleic acid separating and purifying cartridges (Table 1).

Comparative Example 1

The procedure of Example 1 was followed except that the temperature of the casted surface was controlled to 10.0° C.±5.0° C.

Comparative Example 2

The procedure of Example 1 was followed except that the temperature of the polymer solution was controlled to 35.0° C.±5.0° C.

TABLE 1

| Longitudinal position on microporous membrane | Example 1 | Comparative Example 1 | Comparative Example 2 |
|---|---|---|---|
| 1 m | 5.2 sec | 5.5 sec | 12.5 sec |
| 50 m | 4.9 sec | 8.5 sec | 4.8 sec |
| 100 m | 5.8 sec | 26.3 sec | 5.9 sec |
| 150 m | 4.8 sec | 15.6 sec | 21.4 sec |
| 200 m | 4.6 sec | 5.6 sec | 48.7 sec |

As can be seen in the aforementioned comparison of Example 1 with Comparative Examples 1 and 2, the microporous membranes obtained under the production conditions of Comparative Example 1 (temperature of polymer solution: 35.0° C.±3.0° C.; temperature of casted surface: 10.0° C.±5.0° C.) or Comparative Example 2 (temperature of polymer solution: 35.0° C.±5.0° C.; temperature of casted surface: 10.0° C.±3.0° C.) showed a great dispersion of time required for separation and purification of nucleic acid with the longitudinal position on the microporous membrane. On the contrary, the microporous membrane obtained under the production conditions of Example 1 (temperature of polymer solution: 35.0° C.±3.0° C.; temperature of casted surface: 10.0° C.±3.0° C.) showed a substantially constant time required for separation and purification of nucleic acid with the longitudinal position on the microporous membrane. Thus, the microporous membrane of Example 1 provided constant properties.

INDUSTRIAL APPLICABILITY

In accordance with the invention, a membrane having a stabilized porous quality can be obtained regardless of which longitudinal part on the membrane is used.

The invention can further provide a method of producing a membrane having a more stable quality than related art products as a nucleic acid-adsorbable microporous membrane particularly for use in a method of separating and purifying a nucleic acid from a sample solution containing a nucleic acid.

Consequently, the use of the microporous membrane of the invention for the purpose of separating and purifying a nucleic acid makes it possible to solve related art problems arising due to slight longitudinal locality of membrane properties even when a nucleic acid sample containing a relatively large amount of suspended materials, i.e., dispersion of nucleic acid purifying time, incapability of purifying due to clogging and necessity of remarkably long time of separating and purifying nucleic acid though not leading to full clogging. Accordingly, a nucleic acid separating and purifying system having a stabilized performance can be obtained regardless of which longitudinal part on the membrane is used.

The entire disclosure of each and every foreign patent application from which the benefit of foreign priority has been claimed in the present application is incorporated herein by reference, as if fully set forth.

The invention claimed is:
1. A method of producing a porous membrane, the method comprising:
preparing a polymer solution, in which an ester derivative of cellulose is dissolved in a mixture of a good solvent, a poor solvent and a non-solvent;
casting the polymer solution over a surface, wherein a temperature of the casted surface is maintained in a range of 7.0 to 13.0° C. during the casting step, wherein a temperature of the polymer solution is maintained in a range of 32.0 to 38.0° C. during the casting step; and
subjecting the casted polymer solution to a phase separation while drying thereby producing a microporous membrane of cellulose ester derivative;
rendering a part of a surface of the microporous membrane of cellulose ester derivative cellulosic by saponification to form a saponified membrane;
neutralizing the saponified membrane;
rinsing the saponified membrane after the neutralizing; and
heating and drying the saponified membrane after the rinsing by using a contact type drum,
wherein the contact type drum includes a motor for rotationally driving the contact type drum, a temperature controller for detecting a surface temperature of the contact type drum, and a belt which extends around the contact type drum, and
the belt conveys the saponified membrane so that the saponified membrane is interposed between the contact type drum and the belt.

2. The method according to claim 1, wherein the ester derivative of cellulose comprises at least one selected from the group consisting of a carboxylic acid ester, a nitric acid ester, a sulfuric acid ester, a sulfonic acid ester, a phosphoric acid ester, a phosphonic acid ester and a pyrophosphoric acid ester of cellulose.

3. The method according to claim 1, wherein the ester derivative of cellulose is an acetyl cellulose.

4. The method according to claim 3, wherein the acetyl cellulose is a mixture of a triacetyl cellulose and a diacetyl cellulose.

5. The method according to claim 1, wherein a minimum pore diameter of the porous membrane is 0.1 μm or more.

6. The method according to claim 1, wherein the porous membrane has a front surface and a back surface asymmetrical with each other.

7. The method according to claim 1, wherein a ratio of a maximum pore diameter to a minimum pore diameter of the porous membrane is 2 or more.

8. The method according to claim 1, wherein a thickness of the porous membrane is from 10 μm to 500 μm.

9. The method according to claim 1, wherein a void ratio of the porous membrane is from 50% to 95%.

10. The method according to claim 1, wherein a bubble point of the porous membrane is from 0.1 to 10 $kgf/cm^2$.

11. The method according to claim 1, wherein a pressure loss of the porous membrane is from 0.1 kPa to 100 kPa.

12. The method according to claim 1, wherein a water permeability of the porous membrane at a temperature of 25° C. and a pressure of 1 $kg/cm^2$ is from 1 to 5,000 $ml/cm^2$ per minute.

13. The method according to claim 1, wherein an adsorption amount of nucleic acid per mg of the porous membrane is 0.1 μg or more.

14. The method of producing a porous membrane according to claim 1, wherein a percent surface saponification of the microporous membrane of the cellulose ester derivative is 10% or more.

15. The method of producing a porous membrane according to claim 1, wherein the saponification is conducted by dipping the microporous membrane of the cellulose ester derivative into an aqueous solution of sodium hydroxide having a concentration of from 0.1 to 1.0 mol/l with stirring at an ordinary temperature of 15° C. to 35° C. for 10 to 120 minutes.

16. The method of producing a porous membrane according to claim 1, wherein the neutralizing is conducted by dipping the saponified membrane into an aqueous solution of hydrochloric acid having a concentration of from 0.1 to 1.0 mol/l for 10 to 60 minutes.

17. The method of producing a porous membrane according to claim 1, wherein the rinsing, the saponification and the neutralizing steps comprise the use of aqueous solutions, said aqueous solutions comprising nuclease-free water.

18. The method of producing a porous membrane according to claim 1, wherein a surface temperature of the contact type drum is from 100° C. to 200° C. and a conveying speed of the contact type drum is 0.05 to 5.0 m/min.

19. A method of separating and purifying nucleic acid using a porous membrane produced by the method according to claim 1 comprising the steps of:
(1) passing a sample solution containing a nucleic acid through the porous membrane to allow the nucleic acid to be adsorbed to an interior of the porous membrane;

(2) passing a washing solution through the porous membrane to wash the porous membrane while the nucleic acid is adsorbed to the porous membrane; and
(3) passing a recovering solution through the porous membrane to allow the nucleic acid to be desorbed from the interior of the porous membrane.

* * * * *